US008954231B1

(12) United States Patent
Song et al.

(10) Patent No.: US 8,954,231 B1
(45) Date of Patent: Feb. 10, 2015

(54) METHOD, APPARATUS AND COMPUTER-READABLE RECORDING MEDIA FOR PROVIDING APPLICATION CONNECTOR USING TEMPLATE-BASED UI

(71) Applicant: Obigo Inc., Gyeonggi-do (KR)

(72) Inventors: Byung Soo Song, Seoul (KR); Jung Seok Lee, Gyeonggi-do (KR)

(73) Assignee: Obigo Inc., Gyeonggi-do (KR)

( * ) Notice: Subject to any disclaimer, the term of this patent is extended or adjusted under 35 U.S.C. 154(b) by 0 days.

(21) Appl. No.: 14/277,189

(22) Filed: May 14, 2014

(30) Foreign Application Priority Data

Mar. 18, 2014 (KR) ........................ 10-2014-0031620

(51) Int. Cl.
*B60W 50/00* (2006.01)
*G01C 21/36* (2006.01)

(52) U.S. Cl.
CPC ........... *B60W 50/00* (2013.01); *G01C 21/3688* (2013.01); *B60W 2050/002* (2013.01)
USPC ........................................... 701/36; 701/538

(58) Field of Classification Search
CPC . G01C 21/3688; H04L 51/046; G06F 3/0484; G06F 3/1454
USPC ............. 701/36, 538; 715/740, 744, 746, 866
See application file for complete search history.

(56) References Cited

U.S. PATENT DOCUMENTS

| | | | | |
|---|---|---|---|---|
| 8,594,654 B2 * | 11/2013 | Weyl et al. | ..................... | 455/420 |
| 8,634,033 B2 * | 1/2014 | Vanderwall et al. | .......... | 348/837 |
| 8,670,798 B2 * | 3/2014 | Bauer et al. | ................ | 455/556.1 |
| 8,880,331 B1 * | 11/2014 | Song et al. | ..................... | 701/400 |
| 2008/0005679 A1 * | 1/2008 | Rimas-Ribikauskas et al. | ............................. | 715/745 |
| 2008/0261643 A1 * | 10/2008 | Bauer et al. | ..................... | 455/517 |
| 2010/0134240 A1 * | 6/2010 | Sims et al. | ..................... | 340/5.1 |
| 2010/0251134 A1 * | 9/2010 | Van Seggelen et al. | ....... | 715/744 |
| 2010/0259464 A1 * | 10/2010 | Chang et al. | ................... | 345/2.3 |
| 2010/0262673 A1 * | 10/2010 | Chang et al. | ................... | 709/217 |
| 2011/0185390 A1 * | 7/2011 | Faenger et al. | ................. | 725/75 |
| 2012/0242510 A1 * | 9/2012 | Choi et al. | ..................... | 340/988 |
| 2013/0090845 A1 * | 4/2013 | Wakayanagi et al. | ......... | 701/411 |
| 2013/0144469 A1 * | 6/2013 | Ricci | ................................ | 701/2 |
| 2013/0298052 A1 * | 11/2013 | Nara et al. | ..................... | 715/764 |
| 2014/0078022 A1 * | 3/2014 | Dusterhoff | ..................... | 345/3.1 |
| 2014/0163771 A1 * | 6/2014 | Demeniuk | ........................ | 701/2 |
| 2014/0189528 A1 * | 7/2014 | Chang et al. | ................... | 715/752 |

FOREIGN PATENT DOCUMENTS

| | | | | | |
|---|---|---|---|---|---|
| JP | 2004340633 A | * | 12/2004 | ............ | G01C 21/00 |
| JP | 2013213797 A | * | 10/2013 | | |
| WO | WO 2013008901 A1 | * | 1/2013 | | |

* cited by examiner

*Primary Examiner* — Behrang Badii
*Assistant Examiner* — David Testardi
(74) *Attorney, Agent, or Firm* — Husch Blackwell LLP (57) ABSTRACT

The present invention relates to a method for providing an application connector using a template-based user interface. The method includes steps of: (a) classifying information entered from multiple applications of at least one mobile terminal connected with a template of a vehicle head unit into either common information or specialized information; (b) deciding the common information and the specialized information to be provided to the template by matching multiple pieces of the common information entered from the multiple applications with a matching algorithm and filtering multiple pieces of the specialized information entered therefrom with a filtering module; and (c) providing the matched common information and the filtered specialized information through the template.

21 Claims, 8 Drawing Sheets

METHOD, APPARATUS AND COMPUTER-READABLE RECORDING MEDIA FOR PROVIDING APPLICATION CONNECTOR USING TEMPLATE-BASED UI

CROSS REFERENCE TO RELATED APPLICATION

This application claims priority to and incorporates herein by reference all disclosure in Korean Patent Application No, 10-2014-0031620 filed Mar. 18, 2014.

FIELD OF THE INVENTION

The present invention relates to a method, an apparatus, and a computer-readable media for providing an application connector that uses a template-based user interface (UI); and more particularly, to the method, the apparatus, and the computer-readable media for classifying information entered from multiple applications connected with a template of a vehicle head unit into either common information or specialized information, matching multiple pieces of the common information entered therefrom by using a matching algorithm, filtering multiple pieces of the specialized information entered therefrom by using a filtering module, and providing a variety of pieces of information entered therefrom effectively through the template of the vehicle head unit by providing the matched common information and the filtered specialized information as shown above.

BACKGROUND OF THE INVENTION

Today, vehicles have a variety of types of electronic systems, which use various types of applications and big data. Vehicle makers have made much effort to develop technologies for improving performance of electronic systems and applications built in vehicles and continuously managing them.

However, the electronic systems or the applications built in vehicles cannot but use only internal resources of the vehicles. To upgrade or update such systems or applications built therein, the systems themselves need to be substituted or the applications need to be installed again. These require considerable time and costs. Therefore, attempts at replacing electronic systems or applications required for vehicles by using mobile terminals such as smart phones, or tablet computers commonly carried by users (i.e., drivers or passengers) have been made recently.

Thus, the inventor of the present invention intends to propose a technology of providing an application connector that connects a mobile terminal with a vehicle head unit by using a template-based UI.

SUMMARY OF THE INVENTION

It is an object of the present invention to solve all the problems mentioned above.

It is another object of the present invention to classify information entered from multiple applications connected with a template of a vehicle head unit into either common information or specialized information, match multiple pieces of the common information entered from the multiple applications by using a matching algorithm, filter multiple pieces of the specialized information entered therefrom by using a filtering module, and provide the matched common information and the filtered specialized information through the template thereof.

It is still another object of the present invention to provide a variety of pieces of information entered from the multiple applications, e.g., a navigation application or a music player application, executed in multiple mobile terminals through the template of the vehicle head unit integratedly in an environment where the vehicle head unit is connected with the multiple mobile terminals through a variety of communication channels.

In accordance with one aspect of the present invention, there is provided a method for providing an application connector using a template-based user interface, including steps of: (a) classifying information entered from multiple applications of at least one mobile terminal connected with a template of a vehicle head unit into either common information or specialized information; (b) deciding the common information and the specialized information to be provided to the template by matching multiple pieces of the common information entered from the multiple applications with a matching algorithm and filtering multiple pieces of the specialized information entered therefrom with a filtering module; and (c) providing the matched common information and the filtered specialized information through the template.

In accordance with another aspect of the present invention, there is provided an apparatus for providing an application connector using a template-based user interface, including: an application information classifying part for classifying information entered from multiple applications of at least one mobile terminal connected with a template of a vehicle head unit into either common information or specialized information; a common information matching part for deciding the common information to be provided to the template by matching multiple pieces of the common information entered from the multiple applications with use of a matching algorithm; a specialized information filtering part for deciding the specialized information to be provided to the template by filtering multiple pieces of the specialized information entered from the multiple applications with a filtering module; wherein the matched common information and the filtered specialized information are provided through the template.

The above and other objects and features of the present invention will become apparent from the following description of preferred embodiments given in conjunction with the accompanying drawings, in which.

DETAILED DESCRIPTION OF THE PREFERRED EMBODIMENTS

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To allow those skilled in the art to the present invention to be carried out easily, the example embodiments of the present invention by referring to attached diagrams will be explained in detail as follows:

Configuration of the Whole System

Figure 1:
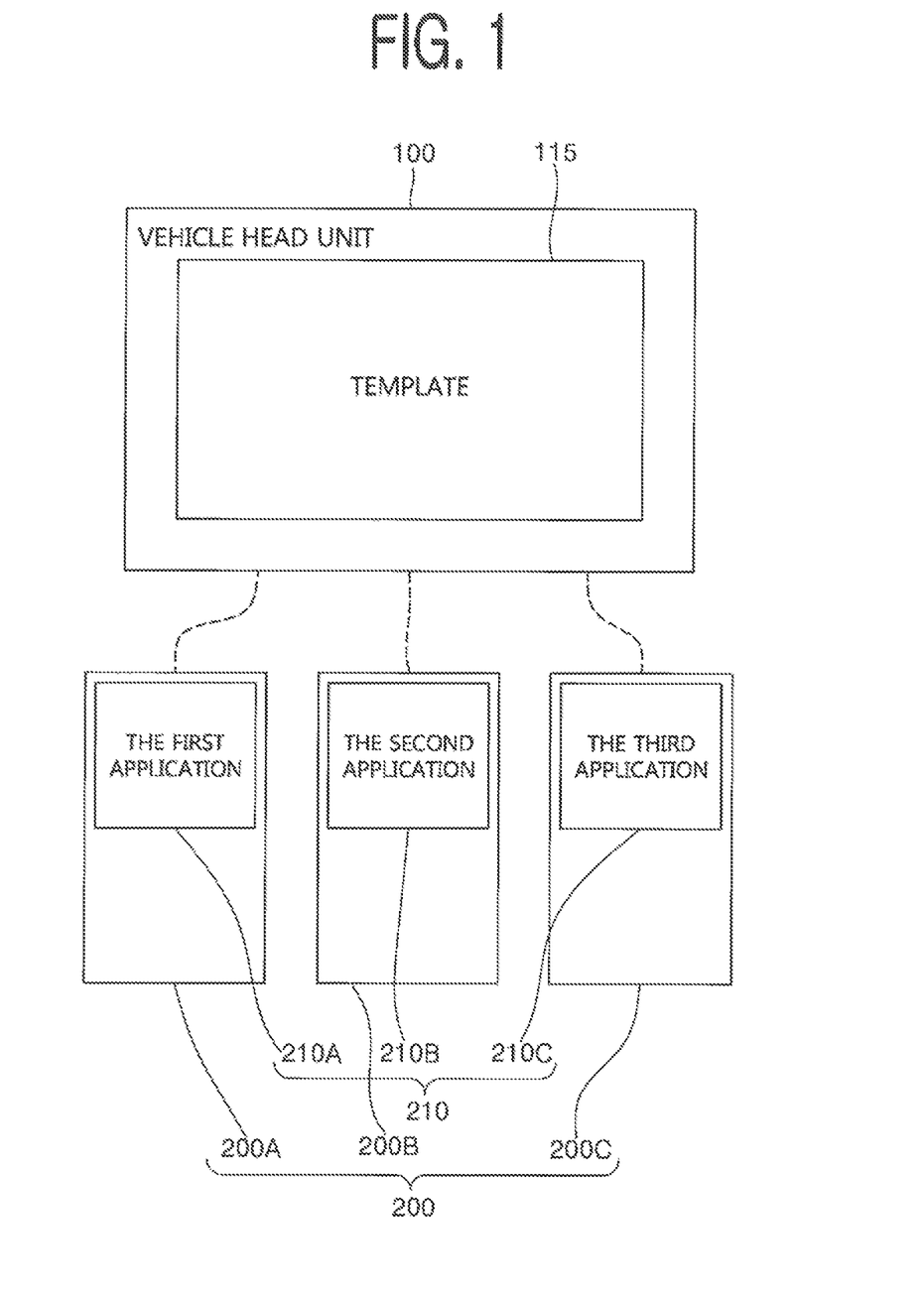
FIG. 1 is a drawing exemplarily showing a configuration of a whole system to implement the present invention.

FIG. 1 exemplarily shows a configuration of a whole system to implement the present invention.

As illustrated in FIG. 1, the whole system in accordance with an example embodiment of the present invention may be configured with a vehicle head unit 100 and mobile terminals 200.

First of all, the vehicle head unit 100 in accordance with an example embodiment of the present invention may perform a function of connecting a template 115 provided by the vehicle head unit 100 with applications 210 executed in the mobile terminals 200, providing a user with information entered from the applications 210 executed therein through the template 115 of the vehicle head unit 100, and transmitting control information entered through the template 115 of the vehicle head unit 100 by the user to the applications 210 executed therein. This may allow the user to use a variety of the applications 210 executed in the mobile terminals 200 through the integrated template 115 of the vehicle head unit 100. However, it is declared that the "integrated" template 115 as mentioned herein does not mean one template and internal components of the integrated template 115 mentioned in the present invention could be changed according to a category which the applications 210 connected with the template 115 belong to, or information which they provide.

In addition, the vehicle head unit 100 in accordance with an example embodiment of the present invention may perform a function of classifying information entered from multiple applications 210A, 210B, and 210C executed in multiple mobile terminals 200A, 200B, and 200C connected with a template 115 of the vehicle head unit 100 into either common information or specialized information, matching multiple pieces of the common information entered from the multiple applications 210A, 210B, and 210C by using a matching algorithm, filtering multiple pieces of the specialized information entered therefrom by using a filtering module, and providing the matched common information and the filtered specialized information as described above through the template 115 of the vehicle head unit 100 and thus providing a variety of pieces of information entered from the multiple applications 210A, 210B, and 210C effectively through the integrated template 115 of the vehicle head unit 100. The meaning of "matching" will be explained in detail by referring to FIG. 6 later.

An internal configuration of the vehicle head unit 100 will be explained in more detail in the part "Configuration of Vehicle Head Unit" to be explained later.

In accordance with an example embodiment of the present invention, the mobile terminals 200 means digital devices that include a function of communicating with the vehicle head unit 100. Such digital devices, including a smart phone, a tablet PC, a PDA, a personal computer (e.g., laptop, etc.), a web pad, or an mobile phone, etc., which have memory means and micro processors with a calculation ability, may be adopted as the mobile terminals 200 in accordance with the present invention. In accordance with an example embodiment of the present invention, various applications 210 including a web browser, a widget, a navigation system, a means for playing music, an e-map, etc. may be installed in the mobile terminals 200, and may operate in interoperation with the template 115 of the vehicle head unit 100.

In accordance with an example embodiment of the present invention, the vehicle head unit 100 and the mobile terminals 200 may be connected through a variety of communication channels in wired or wireless communication methods, e.g., Wi-Fi, Bluetooth (BT), and Universal Serial Bus (USB).

Configuration of Vehicle Head Unit

Below will be explanation on an internal configuration and components of the vehicle head unit 100 that performs important functions to implement the present invention.

Figure 2:
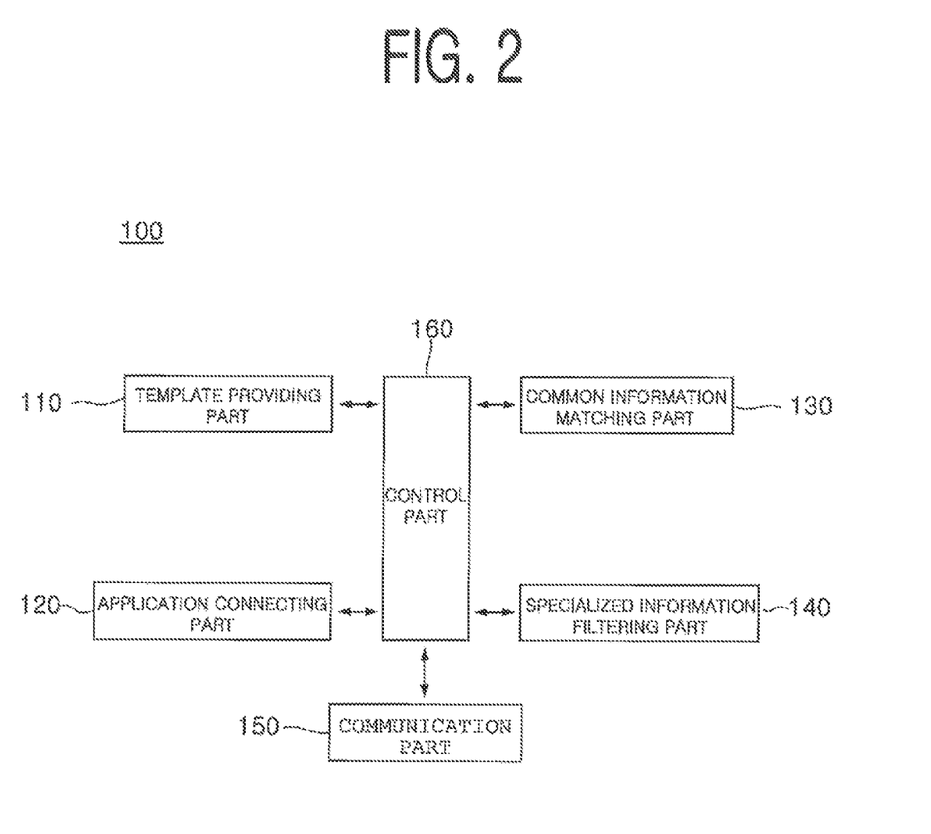
FIG. 2 is a drawing exemplarily showing an internal configuration of a vehicle head unit in accordance with an example embodiment of the present invention.

FIG. 2 exemplarily shows the internal configuration of the vehicle head unit 100 in accordance with an example embodiment of the present invention.

By referring to FIG. 2, the vehicle head unit 100 in accordance with an example embodiment of the present invention may include a template providing part 110, an application connecting part 120, an application information classifying part (not illustrated), a common information matching part 130, a specialized information filtering part 140, a communication part 150, and a control part 160. In accordance with an example embodiment of the present invention, at least some of the template providing part 110, the application connecting part 120, the application information classifying part (not illustrated), the common information matching part 130, the specialized information filtering part 140, the communication part 150 and the control part 160 may be program modules communicating with the vehicle head unit 100. Such program modules may be included in the vehicle head unit 100 in a form of an operating system, an application program module, and other program modules or physically stored in various storage devices well known to those skilled in the art. In addition, they may be stored in a remote storage device capable of communicating with the vehicle head unit 100. The program modules may include but not be subject to a routine, a subroutine, a program, an object, a component, and a data structure for executing a specific operation or a type of specific abstract data that will be described in accordance with the present invention.

First of all, the template providing part 110 in accordance with an example embodiment of the present invention may provide the template 115 that operates in interoperation with the applications 210 connected with the vehicle head unit 100. At the time, it could be introduced that the components of the template 115 are realigned by referring to types of applications and common information and specialized information included in the multiple application and the template 115 whose components are realigned is provided on the vehicle head unit 100. More specifically, the template 115 could be configured to display the information entered from the applications 210 on the screen of the vehicle head unit 100 and transmit control information inputted therethrough by the user to the applications 210. In short, in accordance with an example embodiment of the present invention, the user may be allowed to receive the information entered from the various applications 210 of the mobile terminals 200 connected with the vehicle head unit 100 through the template 115 of the vehicle head unit 100 (i.e., a template-based UI) and the user may control a function of the applications 210 thereof by manipulating the template 115 thereof.

More specifically, the template 115 in accordance with an example embodiment of the present invention may be configured in an integrated form compatible with all of the multiple applications 210A, 210B, and 210C executed in the multiple mobile terminals 200A, 2001B, and 200C and thus the vehicle head unit 100 could interoperate with the multiple applications 210A, 210, and 210C executed in the multiple mobile terminals 200A, 200B, and 200C just by maintaining the template 115 in the integrated form in accordance with the present invention. To do this, the template 115 of the vehicle head unit 100 and the applications 210 of the mobile terminals 200 could share a software library required to interoperate with each other.

Figure 3A:
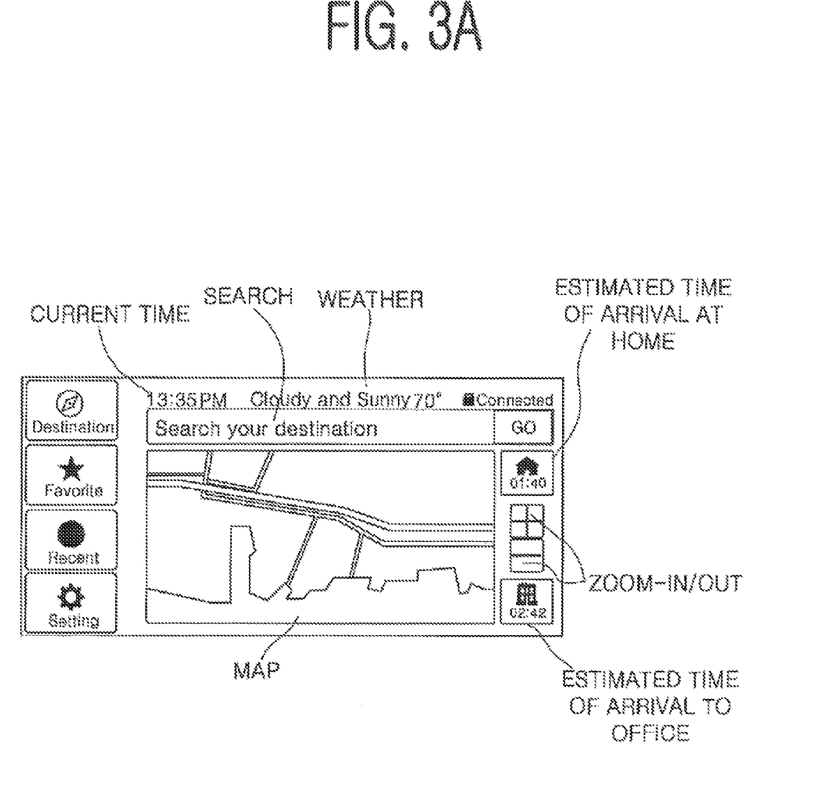
FIGS. 3A and 3B are diagrams exemplarily representing configurations of templates of the vehicle head unit in accordance with example embodiments of the present invention.
Figure 3B:
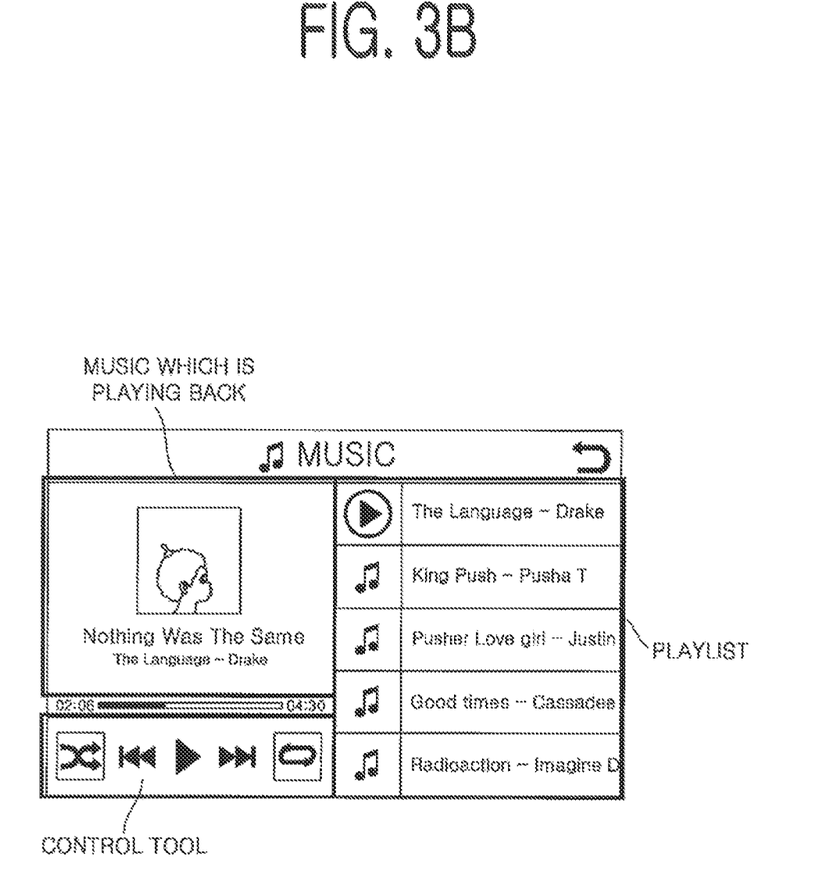

FIGS. 3A and 3B exemplarily represent a configuration of the template of the vehicle head unit in accordance with an example embodiment of the present invention.

By referring to FIG. 3A, a template that may interoperate with the navigation applications of the mobile terminal(s) 200 could include components such as map, search, weather, current time, estimated time of arrival at home, estimated time of arrival to office, zoom-in/out, etc. By referring to FIG. 3B, a template that may interoperate with a music player applications of the mobile terminal(s) 200 could include components such as music which is playing back, a control tool, a playlist, etc.

In accordance with an example embodiment of the present invention, components included in the template may perform a function of displaying information entered from navigation applications 210 of the mobile terminal(s) 200 connected with the vehicle head unit 100 or transmitting control information inputted through the template by the user to the navigation applications 210 of the mobile terminal(s) 200 connected with the vehicle head unit 100.

In addition, the application connecting part 120 in accordance with an example embodiment of the present invention may perform a function of supporting the template 115 of the vehicle head unit 100 and the applications 210 of the mobile terminals 200 to interoperate with each other by connecting them.

More specifically, the application connecting part 120 in accordance with an example embodiment of the present invention may perform a function of allowing event or content information generated from the applications 210 of the mobile terminal(s) 200 to be transmitted to the template 115 of the vehicle head unit 100 and allowing event or content information generated through the template 115 of the vehicle head unit 100 to be transmitted to the applications 210 of the mobile terminal(s) 200.

Figure 4:
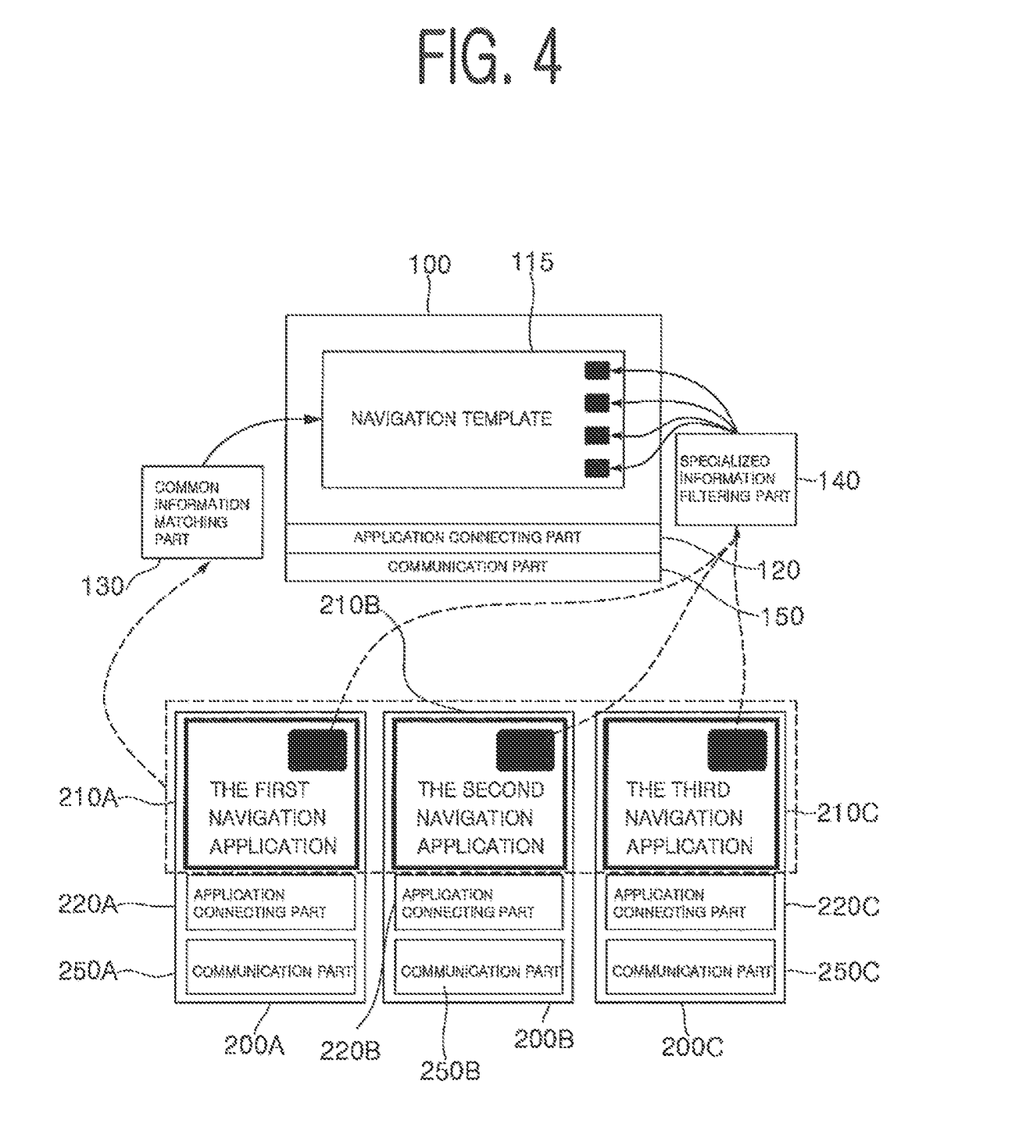
FIG. 4 is a drawing exemplarily representing a configuration of processing information entered from multiple applications in accordance with an example embodiment of the present invention.

In accordance with an example embodiment of the present invention, FIG. 4 exemplarily shows a configuration of processing information entered from multiple applications.

By referring to FIG. 4, the application information classifying part (not illustrated) in accordance with an example embodiment of the present invention may perform a function of classifying information entered from the multiple applications 210A, 210B, and 210C executed in the multiple mobile terminals 200A, 20013, and 200C connected with the template 115 of the vehicle head unit 100 into either common information or specialized information.

More specifically, the common information in accordance with an example embodiment of the present invention means information commonly entered from the multiple applications 210A, 210B, and 210C (i.e., the information with a common attribute acquired from the multiple applications) or information defined by a maker of the vehicle head unit 100, and may correspond to the components included in the template 115 of the vehicle head unit 100, as the case may be. For example, if the multiple applications 210A, 210B, and 210C are navigation applications, information on direction, speed, distance, location, time, etc. may be included as common information.

In accordance with an example embodiment of the present invention, the specialized information indicates information except the common information among pieces of information entered from the multiple applications 210A, 210B, and 210C, i.e., information differentially entered from the multiple applications 210A, 2101B, and 210C or information not defined by the maker of the vehicle head unit 100 and may not correspond to the components included in the template 115 of the vehicle head unit 100, as the case may be. For example, if the multiple applications 210A, 2101, and 210C are the navigation applications, information on traffic volume, GPS accuracy, road lane, map shape, view modes, etc. could be included in the specialized information.

Continuously, by referring to FIG. 4, the common information matching part 130 in accordance with an example embodiment of the present invention may perform a function of matching the same type of multiple pieces of common information from the multiple applications 210A, 210B, and 210C by using a matching algorithm.

Besides, the specialized information filtering part 140 in accordance with an example embodiment of the present invention may perform a function of deciding the specialized information to be provided to the template 115 by filtering multiple pieces of specialized information entered from the multiple applications 210A, 210B, and 210C with a filtering module.

The functions of the common information matching part 130 and the specialized information filtering part 140 will be explained in more detail by referring to FIGS. 5 to 7.

Figure 5:
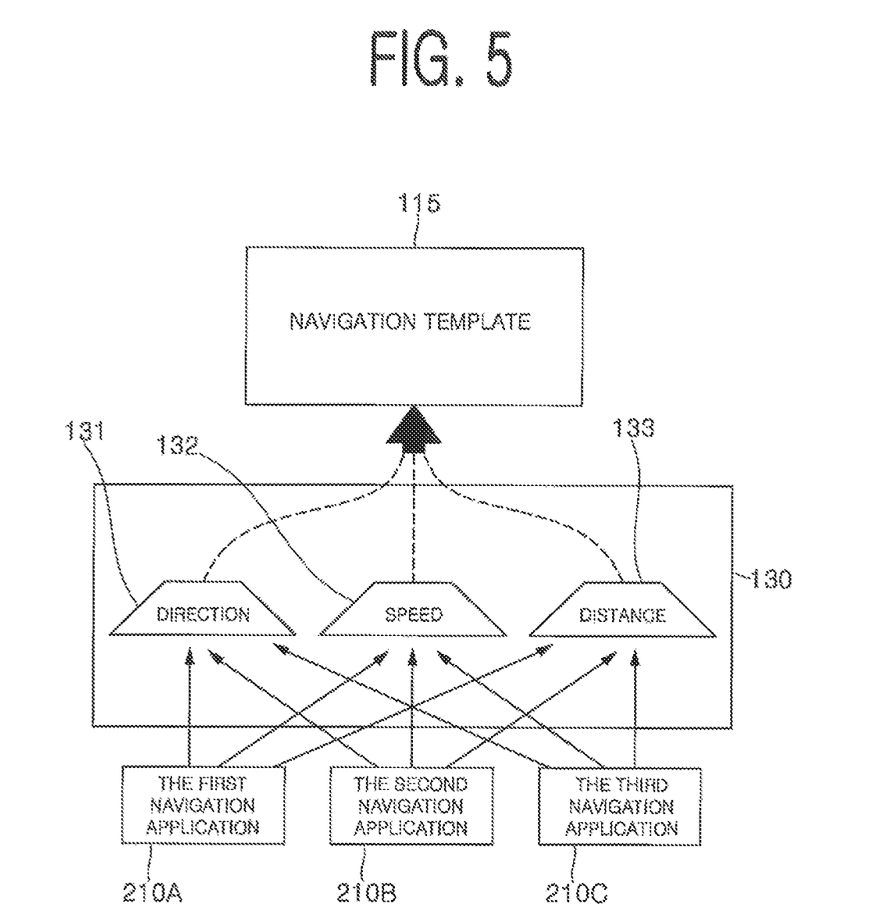
FIGS. 5 and 6 are diagrams exemplarily showing a configuration of matching common information entered from the multiple applications in accordance with an example embodiment of the present invention.
Figure 6:
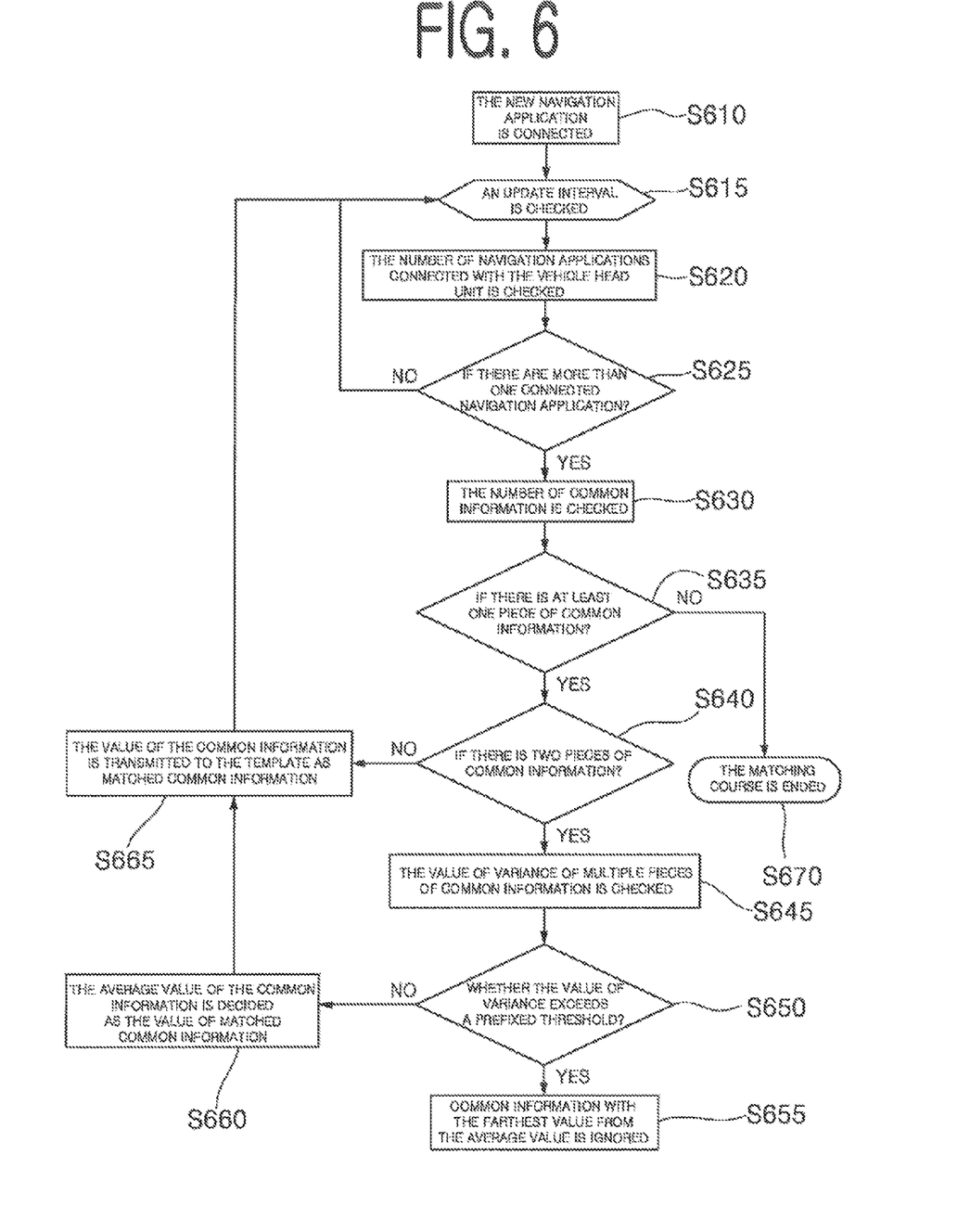

In accordance with an example embodiment of the present invention, FIGS. 5 and 6 are drawings that exemplarily represent a configuration matching common information entered from multiple applications.

By referring to FIG. 5, the common information matching part 130 may classify multiple pieces of information entered from the first, the second, and the third applications 210A, 210B, and 210C by type. For example, the common information may be classified by type such as direction, speed, and distance.

In addition, the common information matching part 130 may match same type of multiple pieces of common information by using the matching algorithm. Besides, the common information matching part 130 may upgrade the matched common information whenever a time interval elapses or an event including connection with a new navigation application is generated.

By referring to FIG. 6, it could be assumed that the new navigation application is connected with the vehicle head unit 100 at a step of S610 and in such case, an update interval for the matched common information could be checked at a step of S615.

Continuously, by referring to FIG. 6, after checking the number of navigation applications connected with the vehicle head unit 100 at steps of S620 and S625, if there are less than two connected navigation applications, the matching course is ended and is returned to the step of S615 to check the update interval again and if there are two or more connected navigation applications, the matching course may continue to proceed.

Continuously, by referring to FIG. 6, after checking the number of pieces of common information in the same type entered from the two or more navigation applications at steps of S630, S635, and S640, if there is less than one piece of common information, the matching course is ended at a step of S670; if there is one piece of common information, the value of the common information is immediately transmitted to the template 115 of the vehicle head unit 100 as matched common information at a step of S665; and if there are two or more pieces of common information, the matching course may continue to proceed at a step of S645.

Continuously, by referring to FIG. 6, after checking common information on whether common information having an outlier value that makes variance exceed a prefixed threshold exists among two or more pieces of common information (i.e., whether common information with the outlier value beyond the scope of not exceeding the prefixed variance) at steps of S645 and S650, if there exists common information with the outlier value, the matching course continues to proceed while the common information (i.e., common information with the farthest value from the average value) is ignored at a step of S655 and if there does not exist common information with the outlier value, the average value of two or more pieces of common information may be decided as the value of matched common information at a step of S660.

As explained above, an effect of accurately providing common information relating to a drive of the vehicle (e.g., a direction, a speed, a distance, etc.) to the template 115 of the vehicle head unit 100 by matching a variety of pieces of common information entered from the multiple navigation applications 210A, 210B, and 210C could be achieved.

It is disclosed that the matching algorithm used in the common information matching part 130 in accordance with the present invention is not only limited to what is mentioned above, and may be changed at any time within a scope of achieving the object of the present invention as well.

Figure 7:
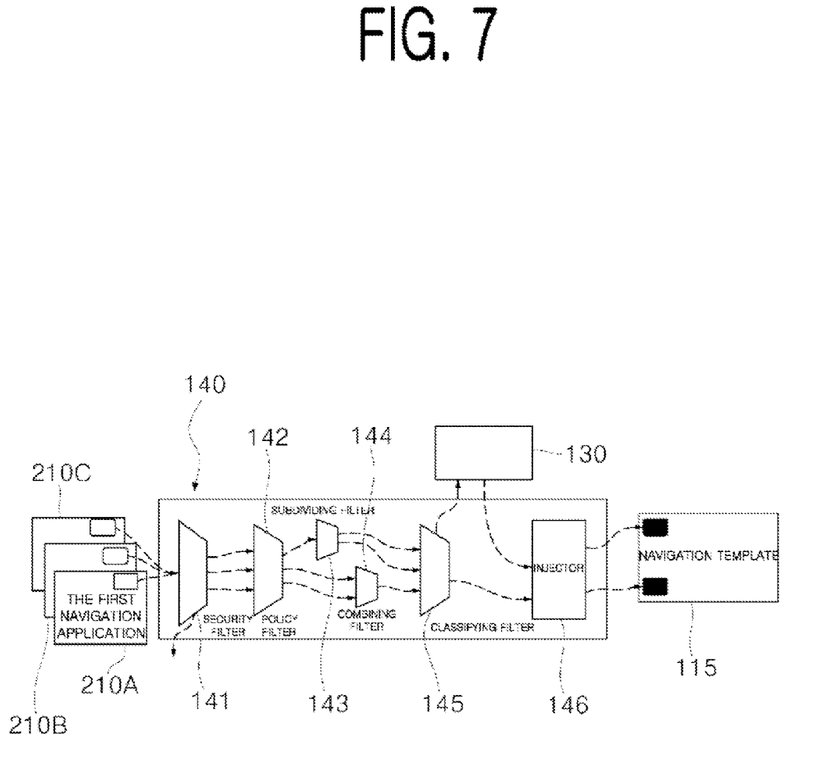
FIG. 7 is a diagram that exemplarily represents a configuration of filtering specialized information entered from the multiple applications in accordance with an example embodiment of the present invention.

FIG. 7 exemplarily represents a configuration of filtering specialized information entered from the multiple applications in accordance with an example embodiment of the present invention.

By referring to FIG. 7, the specialized information filtering part 140 in accordance with an example embodiment of the present invention may perform a filtering process by using at least one of various filtering modules, including a security filter 141, a policy filter 142, a subdividing filter 143, a combining filter 144, and a classifying filter 145, to select specialized information to be provided through the template 115 of the vehicle head unit 100 among multiple pieces of specialized information entered from the multiple navigation applications 210A, 210B, and 210C.

More specifically, by referring to FIG. 7, the security filter 141 may perform a function of removing the specialized information that does not meet a preset security standard by a vehicle maker, etc. while the policy filter 142 may perform a function of removing specialized information that does not meet a predetermined policy by the vehicle maker, etc. While the subdividing filter 143 and the combining filter 144 may perform functions of subdividing different types of pieces of specialized information or combining same type of pieces of specialized information, the classifying filter 145 may perform a function of cancelling a certain specialized information which has been determined to be the common information through the subdividing filter 143 or the combining filter 144 as explained above and transmitting the certain specialized information to the common information matching part 130 as described above.

Of course, it is declared that the filtering module that may be used by the specialized information filtering part 140 in accordance with the present invention is not limited to what is listed above, and a new filtering module may be added within the scope of achieving the purpose of the present invention.

In accordance with an example embodiment of the present invention, the common information matching part 130 and the specialized information filtering part 140 may further include an injector 146 which allows the matched common information and the filtered specialized information as shown above to be displayed by transmitting the information to the template 115 of the vehicle head unit 100.

It is disclosed that the navigation application, as an application executed in the mobile terminal, was mainly explained above, but the types of applications applicable in the present invention are not limited only to the navigation applications as listed above, and different types of applications (e.g., a music player application, a point of interest (POI) application, etc.) could be applied to the present invention within the scope of achieving the purpose of the present invention as well.

Besides, the communication part 150 in accordance with an example embodiment of the present invention performs a function of allowing the vehicle head unit 100 to be communicated with an external system such as the mobile terminal 200.

Finally, the control part 160 in accordance with one example embodiment of the present invention performs a function of controlling data flow among the template providing part 110, the application connecting part 120, the application information classifying part (not illustrated), the common information matching part 130, the specialized information filtering part 140, and the communication part 150. In short, the control part 160 in accordance with the present invention may control the flow of data from outside or among the components of the vehicle head unit 100, and thereby allow the template providing part 110, the application connecting part 120, the application information classifying part (not illustrated), the common information matching part 130, the specialized information filtering part 140, and the communication part 150 to perform their unique functions.

In accordance with the present invention, various pieces of information entered from the multiple applications can be provided effectively through the template of the vehicle head unit.

In accordance with the present invention, as a variety of pieces of information entered from the multiple navigation applications can be matched and filtered, information relating to a driving route guide can be provided for the user more accurately.

Besides, in accordance with the present invention, as a variety of pieces of information entered from the multiple navigation applications can be provided integratedly through the template of the vehicle head unit, driver impairment factors that may occur when a variety of pieces of information is provided for a driver can be removed.

The embodiments of the present invention as explained above can be implemented in a form of executable program command through a variety of computer means recordable to computer readable media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A method for providing an application connector using a template-based user interface, comprising steps of:
   (a) classifying, via a vehicle head unit, a plurality of pieces of information entered from multiple applications of at least one mobile terminal connected with a template of the vehicle head unit into either common information or specialized information;
   (b) deciding the common information and the specialized information to be provided to the template by matching, via the head unit, multiple pieces of common information entered from the multiple applications with a matching algorithm;
   (c) filtering, via the head unit, multiple pieces of specialized information entered therefrom from the multiple applications with a filtering module; and
   (d) providing the matched common information and the filtered specialized information through the template.

2. The method of claim 1, wherein the multiple applications are executed in different mobile terminals or in a same mobile terminal.

3. The method of claim 1, wherein the common information is preset by a maker of the vehicle head unit.

4. The method of claim 1, wherein the specialized information is information other than the common information among pieces of information entered from the multiple applications.

5. The method of claim 1, wherein the multiple applications are navigation applications.

6. The method of claim 5, wherein the common information includes at least one piece of information on a direction, a speed, a distance, a location, and a time.

7. The method of claim 5, wherein the specialized information includes at least one piece of information on a traffic volume, a GPS accuracy, a vehicle lane, a map shape, or a view mode.

8. The method of claim 1, wherein the step of (b) includes steps of:
   (b1) classifying multiple pieces of the common information by type of piece of information; and
   (b2) deciding as the matched common information an average value of at least one of piece of the common information that have values within a scope of not exceeding a prefixed variance among multiple pieces of the common information classified into a same type.

9. The method of claim 1, wherein, at the step of (c), the multiple pieces of specialized information are filtered by using at least one of a security filter, a policy filter, a subdividing filter, a combining filter, and a classifying filter.

10. The method of claim 1, wherein the steps of (a) through (c) are performed whenever a certain time interval elapses or a prearranged event is generated.

11. An apparatus for providing an application connector using a template-based user interface, comprising:
   a head unit of a vehicle including:
      an application information classifying part for classifying a plurality of pieces of information entered from multiple applications of at least one mobile terminal connected with a template of the vehicle head unit into either common information or specialized information;
      a common information matching part matching multiple pieces of common information entered from the multiple applications with use of a matching algorithm;
      a specialized information filtering part for filtering pieces of specialized information entered from the multiple applications with a filtering module;
      wherein the matched common information and the filtered specialized information are provided through the template.

12. The apparatus of claim 11, wherein the multiple applications are executed in different mobile terminals or in a same mobile terminal.

13. The apparatus of claim 11, wherein the common information is preset by a maker of the vehicle head unit.

14. The apparatus of claim 11, wherein the specialized information is information other than the common information among pieces of information entered from the multiple applications.

15. The apparatus of claim 11, wherein the multiple applications are navigation applications.

16. The apparatus of claim 15, wherein the common information includes at least one piece of information on a direction, a speed, a distance, a location, and a time.

17. The apparatus of claim 15, wherein the specialized information includes at least one piece of information on a traffic volume, a GPS accuracy, a vehicle lane, a map shape, or a view mode.

18. The apparatus of claim 11, wherein the common information matching part classifies multiple pieces of the common information by type of piece of information and decides as the matched common information an average value of at least one piece of the common information that have values within a scope of not exceeding a prefixed variance among multiple pieces of the common information classified into a same type.

19. The apparatus of claim 11, wherein the specialized information filtering part filters the multiple pieces of the specialized information by using at least one of a security filter, a policy filter, a subdividing filter, a combining filter, and a classifying filter.

20. The apparatus of claim 11, wherein the common information matching part and the specialized information filtering part operate whenever a certain time interval elapses or a prearranged event is generated.

21. One or more non-transitory computer-readable recording media having stored thereon a computer program that, when executed by one or more processors, causes the one or more processors to perform acts including:
  (a) classifying, via a vehicle head unit, a plurality of pieces of information entered from multiple applications of at least one mobile terminal connected with a template of the vehicle head unit into either common information or specialized information;
  (b) deciding the common information and the specialized information to be provided to the template by matching, via the head unit, multiple pieces of common information entered from the multiple applications with a matching algorithm;
  (c) filtering, via the head unit, multiple pieces of specialized information entered therefrom from the multiple applications with a filtering module; and
  (d) providing the matched common information and the filtered specialized information through the template.

* * * * *